United States Patent [19]

Abe

[11] Patent Number: 4,672,935

[45] Date of Patent: Jun. 16, 1987

[54] INTAKE AIR CONTROL SYSTEM FOR AN AUTOMOTIVE ENGINE

[75] Inventor: Kunihiro Abe, Higashimurayama, Japan

[73] Assignee: Fuji Jukogyo Kabushiki Kaisha, Tokyo, Japan

[21] Appl. No.: 789,877

[22] Filed: Oct. 21, 1985

[30] Foreign Application Priority Data

Oct. 26, 1984 [JP] Japan ............................. 59-226256

[51] Int. Cl.$^4$ .............................................. F02D 9/02
[52] U.S. Cl. ..................................... 123/339; 123/586
[58] Field of Search ................................ 123/586, 339

[56] References Cited

U.S. PATENT DOCUMENTS 4,414,943 11/1983 Nagase ............................... 123/339

Primary Examiner—William A. Cuchlinski, Jr.
Attorney, Agent, or Firm—Martin A. Farber

[57] ABSTRACT

A system for controlling the amount of intake air of an engine at cold engine operation. A control valve is provided in a bypass around a throttle valve of the engine. When the throttle valve is closed to a position near the throttle valve closed position, the control valve is held in an open state for a predetermined period, and thereafter the control valve is closed.

10 Claims, 5 Drawing Figures

INTAKE AIR CONTROL SYSTEM FOR AN AUTOMOTIVE ENGINE

BACKGROUND OF THE INVENTION

The present invention relates to a system for controlling the amount of intake air in an automotive engine, and more particularly to a system for controlling the intake air at rapid closing of a throttle valve of the engine.

When the throttle valve closes rapidly after the driver releases the accelerator pedal, air-fuel mixture can be momentarily excessively enriched. This causes an increase of the hydrocarbon and carbon monoxide content in the exhaust gases. To prevent increase of the pollutants, the motor vehicle is equipped with a dashpot or a control valve in a bypass around the throttle valve.

The dashpot is adapted to prevent the throttle valve from rapidly closing. The control valve is arranged so as to slowly close to control the amount of intake air so as to prevent excessive enrichment of the air-fuel mixture. On the other hand, pollution of the exhaust gases by rapid closing of the throttle valve is aggravated during the warming up operation of the engine. However, if the intake air control systems are designed so as to prevent the enrichment in accordance with conditions during warming up, the driveability of the vehicle deteriorates at normal operating temperature. Accordingly, it is difficult to provide an intake air control system which may resolve this inconsistent problem.

SUMMARY OF THE INVENTION

The object of the present invention is to provide a system for a bypass air control valve which can reduce the pollutants in the exhaust gases without reducing the driveability of a motor vehicle at normal operating temperatures.

To this end, according to the present invention, there is provided a system for controlling the intake air by-passing a throttle valve provided in an intake passage of an automotive engine, which comprises a control valve provided in a bypass to control the amount of intake air, actuating means for operating the control valve, means responsive to the position of the throttle valve for producing a first throttle position signal and for producing a second throttle position signal when the throttle valve is closed to a position near a throttle valve closed position, means responsive to the first throttle position signal for determining the opening degree of the control valve, and means responsive to the second throttle position signal for gradually closing the control valve.

In an aspect of the present invention the temperature of coolant of the engine is detected and a temperature signal is produced dependent on the temperature, and the opening degree of the control valve is corrected in accordance with the temperature signal.

The other objects and features of this invention will become understood from the following description with reference to the accompanying drawings.

DETAILED DESCRIPTION OF THE PREFERRED EMBODIMENT

Figure 1:
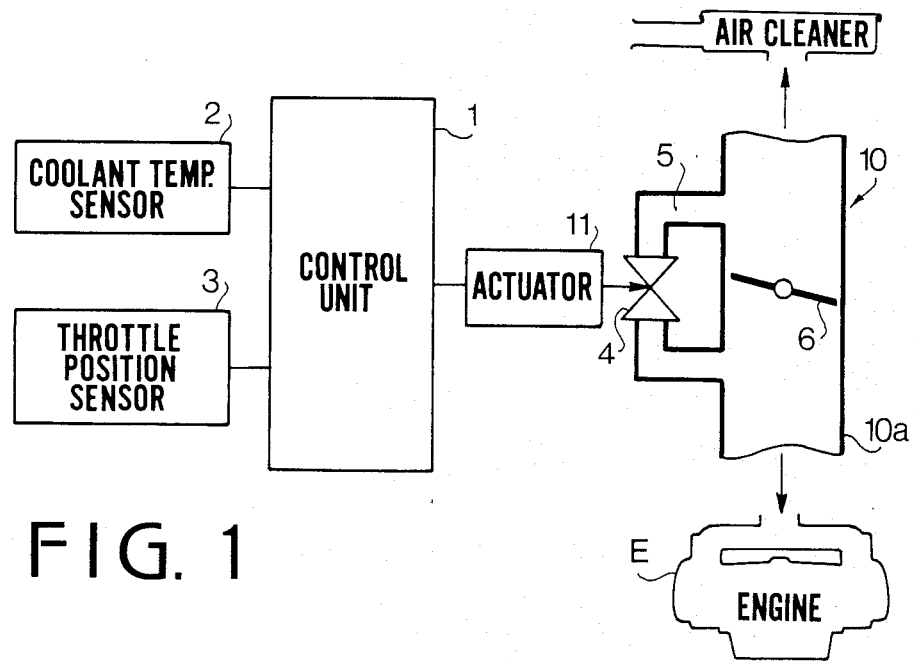
FIG. 1 is a schematic diagram of a system according to the present invention.

Referring to FIG. 1 showing a system of the invention, a throttle body 10 defines an intake passage 10a. A bypass 5 is formed in the throttle body around a throttle valve 6 provided in the intake passage. A control valve 4 is provided in the bypass 5 so as to control the amount of a part of the intake air induced into an engine E. The system is provided with an electronic control unit 1 which is applied with a signal from a coolant temperature sensor 2 and with a signal from a throttle position sensor 3. The output of the control unit is applied to an actuator 11, such as a solenoid, which operates the control valve 4.

Figure 2:
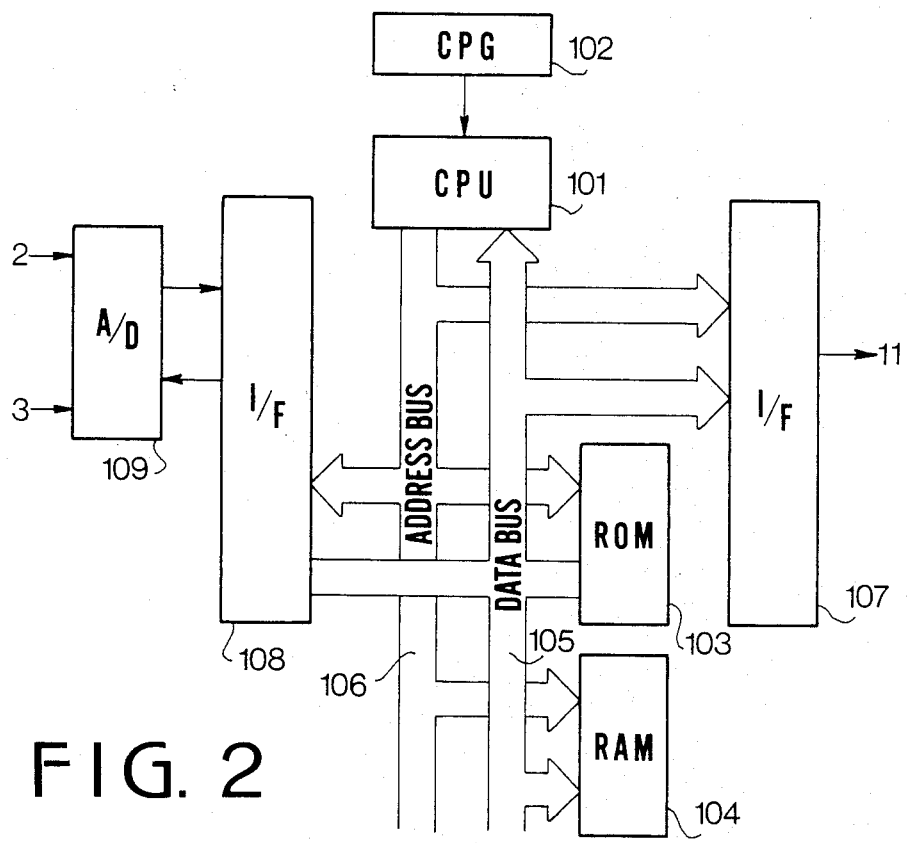
FIG. 2 is a block diagram showing a control unit used in the system.

Referring to FIG. 2 showing the construction of the control unit 1, the unit is provided with a ROM 103 storing an operating program, a RAM 104 for storing data, a CPU 101 for executing the operating program stored in the ROM 103, data bus 105, an address bus 106, and a clock pulse generator 102. Signals from the coolant temperature sensor 2 and throttle position sensor 3 are applied to the control unit through an A/D convertor 109 and an input interface 108. The output signal of the control unit is applied to the actuator 11 for actuating the control valve 4 through an output interface 107.

Figure 3:
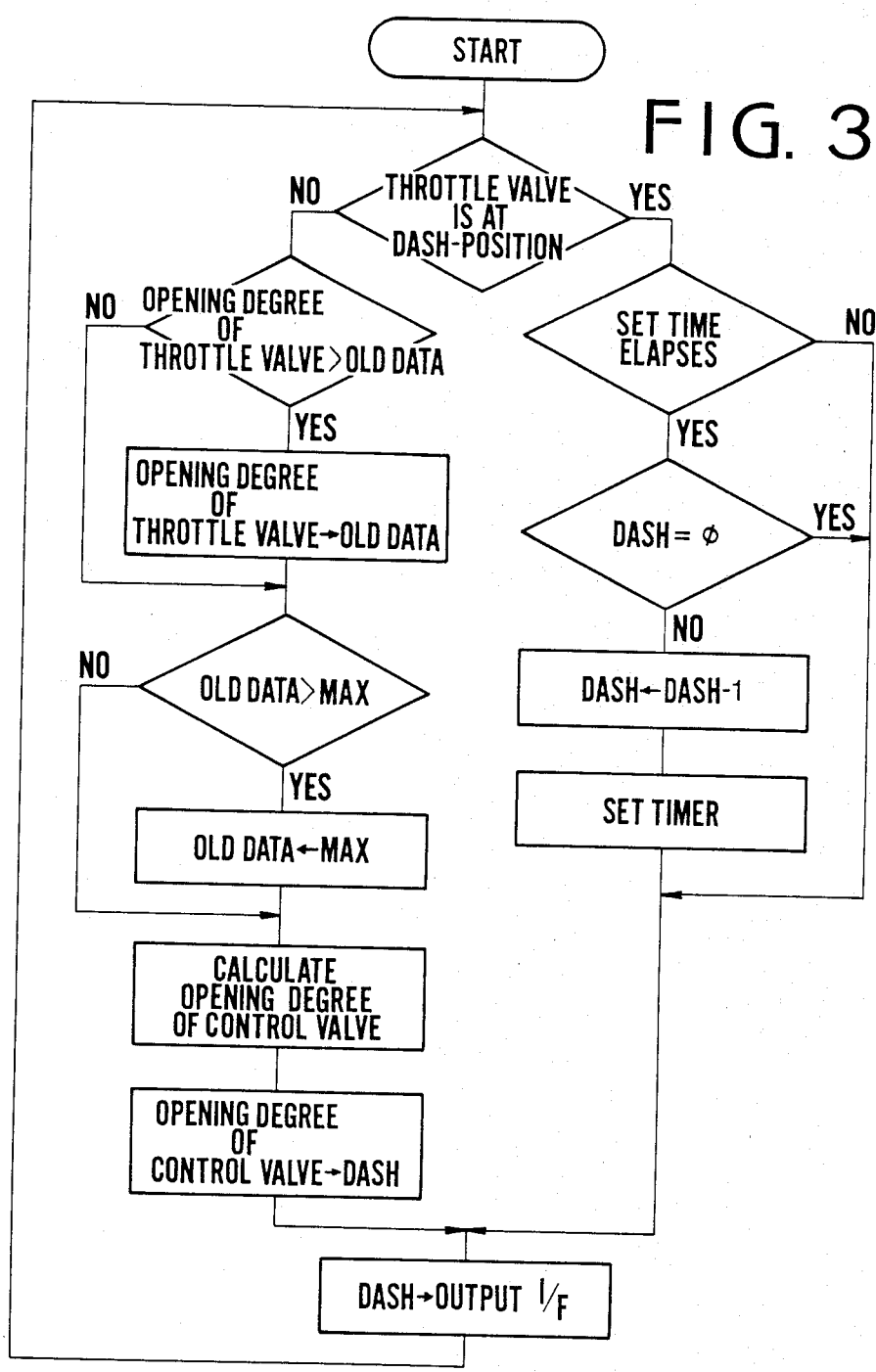
FIG. 3 is a flowchart showing the operation of the system.

FIG. 3 shows a flowchart of the operation of the system. In the flowchart, a dash-position (idle opening position of the throttle valve) is a position near a throttle valve closed position. That is, the dash-position corresponds to a dashpot operating position in the conventional dashpot. When the throttle valve is not at the dash-position, a signal of the throttle position sensor 3 at a sampling is compared with the last signal at the last sampling. When the new data is larger than the old data, which means that the opening degree of the throttle valve increases, the old data is substituted by the new data as maximum data of that time. When the opening degree of the throttle valve exceeds a value which corresponds to a determined opening degree of the control valve 4, a maximum data in the period from the opening of the throttle valve to its closing to the dash-position is stored in the RAM 104. The opening degree of the control valve 4 is calculated based on the maximum data stored in RAM 104 and ROM 103 to produce a data of DASH which is stored in the RAM, and the control valve 4 is opened to a determined position in accordance with the data of DASH. When the throttle valve is closed to the dasa-position, the stored data is decreased little by little at regular intervals. Thus, the control valve is gradually closed so as to prevent an extreme enrichment of the mixture.

Figure 5:
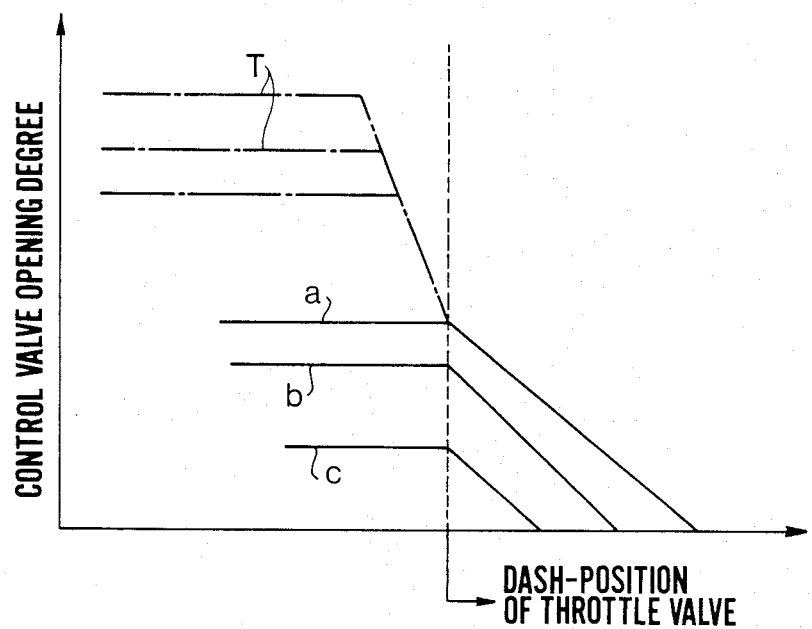
FIG. 5 is a graph showing the opening degree of a control valve.

FIG. 5 shows the operation of the control valve 4. The control valve is opened to a degree a, b or c dependent on the opening degree of the throttle valve. Reference T shows the movement of the throttle valve.

Figure 4:
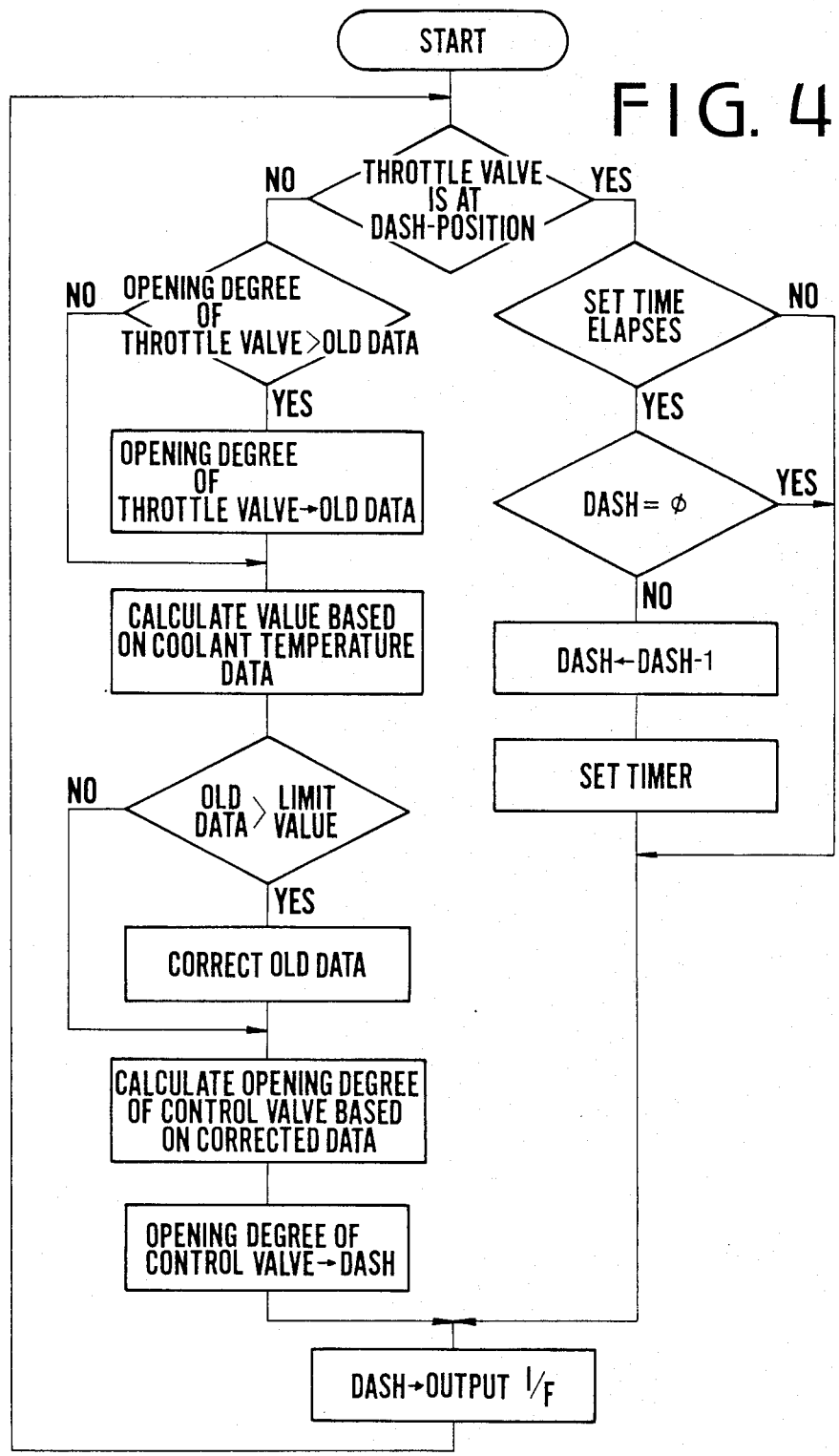
FIG. 4 is a flowchart showing the operation of another embodiment.

FIG. 4 shows the operation of another embodiment of the invention. In the system, a limit value according to the temperature of the coolant is calculated. When the previously determined old data based on the opening degree of the throttle valve exceeds the limit value by the coolant temperature, the old data is corrected to the limit value. Accordingly, the opening degree of the control valve 4 is calculated based on the corrected data. The other operations are the same as FIG. 3.

In the system of the present invention, since the opening degree of the control valve is determined in accordance with the opening degree of the throttle valve and is gradually closed, the amount of intake air can be properly controlled in accordance with vehicle driving conditions. Further, the opening degree of the control valve is controlled in accordance with the temperature of the coolant, thereby improving the emission control without reducing the driveability of the vehicle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling intake air in an automotive engine having an intake passage through which an air-fuel mixture passes, a throttle valve in the intake passage, and a bypass bypassing the throttle valve, comprising:

a control valve provided in the bypass to control the amount of bypassing air;

actuating means for operating the control valve;

first means for detecting a maximum opening of the throttle valve during a period from opening to closing of the throttle valve and for producing a first throttle position signal dependent on the value of the maximum opening of the throttle valve, and for producing a second throttle position signal when the throttle valve is closed to an idle position, respectively;

said first means responsive to the first throttle position signal for determining an opening degree of the control valve in dependency on the value of said maximum opening of the throttle valve, and for operating the actuating means to open the control valve to said opening degree of the control valve; and said first means responsive to the second throttle position signal for operating the actuating means for gradually closing the control valve from said opening degree of the control valve, whereby excessive enrichment of the air-fuel mixture is prevented during a rapid closing of the throttle valve.

2. The system according to claim 1, wherein said first means is further for detecting the temperature of a coolant of the engine and for producing a temperature signal dependent on said temperature, and for correcting the opening degree of the control valve in accordance with the temperature signal.

3. The system according to claim 1, wherein said means is further for detecting the temperature of coolant of the engine and producing a temperature signal dependent on said temperature, for calculating a limit value depending on said temperature signal, and for correcting the opening degree of the control valve dependent on said limit value.

4. The system according to claim 1, wherein said first means further for determining a maximum opening degree of said control valve when said maximum opening of said throttle valve exceeds a predetermined value.

5. The system according to claim 4, wherein said first means is further for detecting the temperature of a coolant of the engine and for producing a temperature signal dependent on said temperature, and for correcting the opening degree of the control valve in accordance with the temperature signal.

6. The system according to claim 4, wherein said means is further for detecting the temperature of coolant of the engine and producing a temperature signal dependent on said temperature, for calculating a limit value depending on said temperature signal, and for correcting the opening degree of the control valve dependent on said limit value.

7. A method for controlling the intake air in an automotive engine having an intake passage, a throttle valve in the intake passage, a bypass bypassing the throttle valve, a control valve in the bypass to control amount of bypassing air, the method comprising the steps of detecting a maximum opening of the throttle valve during a period from opening to closing of the throttle valve, producing a first throttle position signal depending on the maximum opening of the throttle valve and producing a second throttle position signal when the throttle valve is closed to an idle position, respectively, determining an opening degree of the control valve dependent on the first throttle position signal, opening the control valve to said opening degree of the control valve, and gradually closing the control valve from said opening degree of the control valve in response to the second throttle position.

8. The method according to claim 7, further comprising the steps of detecting a temperature of a coolant of the engine and producing a temperature signal dependent on the temperature, calculating a limit value dependent on the temperature signal, and correcting the opening degree of the control valve dependent on said limit value.

9. The method according to claim 7, further comprising the step of determining a maximum opening degree of said control valve when said maximum opening of said throttle valve exceeds a predetermined value.

10. The method according to claim 9, further comprising the steps of detecting a temperature of a coolant of the engine and producing a temperature signal dependent on the temperature, calculating a limit value dependent on the temperature signal, and correcting the opening degree of the control valve dependent on said limit value.

* * * * *